United States Patent
Yang et al.

(10) Patent No.: US 10,713,065 B2
(45) Date of Patent: Jul. 14, 2020

(54) METHOD FOR PROVIDING FISHING COMPETITION MANAGEMENT SERVICE

(71) Applicant: HUMAN ICT CO., LTD., Seoul (KR)

(72) Inventors: Jae-hyuck Yang, Daegu (KR); Ki-heon Kang, Seoul (KR)

(73) Assignees: HUMAN ICT CO., LTD., Seoul (KR); TAG, Seoul (KR)

( * ) Notice: Subject to any disclaimer, the term of this patent is extended or adjusted under 35 U.S.C. 154(b) by 46 days.

(21) Appl. No.: 15/761,286

(22) PCT Filed: Jun. 15, 2016

(86) PCT No.: PCT/KR2016/006341
§ 371 (c)(1),
(2) Date: Mar. 19, 2018

(87) PCT Pub. No.: WO2017/047910
PCT Pub. Date: Mar. 23, 2017

(65) Prior Publication Data
US 2018/0260233 A1    Sep. 13, 2018

(30) Foreign Application Priority Data
Sep. 18, 2015    (KR) .................. 10-2015-0132330

(51) Int. Cl.
*A63F 13/818* (2014.01)
*G06F 9/451* (2018.01)
(Continued)

(52) U.S. Cl.
CPC .............. *G06F 9/451* (2018.02); *A01K 99/00* (2013.01); *G06Q 50/10* (2013.01); *G06F 8/60* (2013.01)

(58) Field of Classification Search
CPC .................................... A63F 13/818
See application file for complete search history.

(56) References Cited

U.S. PATENT DOCUMENTS

2008/0140234 A1* 6/2008 Shafter .................. G06Q 10/10
                                                                700/91
2012/0004956 A1* 1/2012 Huston .................. H04W 4/21
                                                                705/14.1

FOREIGN PATENT DOCUMENTS

JP    2000-262199 A    9/2000
JP    2003-187100 A    7/2003
(Continued)

*Primary Examiner* — Omkar A Deodhar
(74) *Attorney, Agent, or Firm* — Novick, Kim & Lee, PLLC; Jae Youn Kim

(57) ABSTRACT

A method for providing fishing tournament management service may include steps of transmitting data to a plurality of mobile devices, wherein the data may display a fishing tournament-related display including information on fishing tournaments being prepared for opening and a registration menu; receiving applications through the registration menu and transmitting information on application receipts to the mobile devices through which applicants have registered; receiving information on captured fish when a fishing tournament is started, from the mobile devices, to check the species and length thereof; analyzing the information on captured fish, generating ranking information if the analyzed information on captured fish corresponds to the predetermined reference and then transmitting the ranking information to the mobile devices through which applicants have registered; and determining winners according to the ranking information when the fishing tournament is over and transmitting information including winner information to the mobile devices through which applicants have registered.

9 Claims, 12 Drawing Sheets

(51) Int. Cl.
*G06Q 50/10* (2012.01)
*A01K 99/00* (2006.01)
*G06F 8/60* (2018.01)

(56) References Cited

FOREIGN PATENT DOCUMENTS

| | | |
|---|---|---|
| JP | 2004-290025 A | 10/2004 |
| JP | 2009-110489 A | 5/2009 |
| KR | 10-2009-0015421 A | 2/2009 |

* cited by examiner

METHOD FOR PROVIDING FISHING COMPETITION MANAGEMENT SERVICE

CROSS-REFERENCE TO RELATED APPLICATION

The present application claims priority to and the benefit of Korean Patent Application No. 10-2015-0132330 filed in the Korean intellectual Property Office on Sep. 18, 2015, the entire contents of which are incorporated herein by reference.

BACKGROUND

Technical Field

The present invention relates to a method for providing a fishing tournament management service. More particularly, the method for providing fishing tournament management service is capable of opening and managing fishing tournaments by using mobile devices.

Description of the Related Art

Fishing is the activity of trying to catch fish, shellfish, crustaceans and other aquatic animals using instruments such as a fishing rod, a fishing line, a fish hook and etc. There are many different views on the fishing population enjoying recreational fishing and the catch of fish in the fishing industry. Meanwhile, there is an opinion that the fishing population is estimated at 6 million people and the catch of fish reaches to several million tons.

As the above, it is unclear to understand the scale of both the fishing population and the fishing market. However, since fishing channels are organized on the cable television and sea fishing is introduced in various entertainment programs on the broadcast television, the fishing population is presumed to be increased every year.

Further, as fishing becomes popular and the fishing population has been increased, various fishing tournaments are opened and it is known that there are 100 or more fishing tournaments held every year by the central and local governments together with fishing equipment production companies.

Fishing tournaments include river fishing-, sea fishing- and lure fishing-tournaments by types. A host informs of the date, time, place, rule, method and fishing type of a fishing tournament. Participants register therefor and move to the place where the fishing tournament is opened. In the view of foregoing, fishing tournaments are generally managed.

According to the above, fishing tournaments should proceed when participants move to specific places on specific dates. Further, it seems to be hard for ordinary persons to apply thereto because they have preconceptions that only professionals would participate therein and there is a restriction on the entry therefor. Further, very strict examination procedures should follow to decide who wins after finishing the tournament.

Accordingly, it is necessary to consider a method for managing fishing tournaments to which a host can easily apply various rules what he/she wants without any restrictions on the place, the time, the entry and etc., by using mobile devices, such as a smart phone.

SUMMARY OF THE INVENTION

An aspect of the present invention provides a method for providing a fishing tournament management service thereby easily applying various rules what a host wants to fishing tournaments and managing them without any restrictions on the place, the time, the entry and etc., by using mobile devices, such as a smart phone.

In accordance with one aspect of the present invention, there is provided a method for providing a fishing tournament management service may include steps of transmitting data to a plurality of mobile devices, wherein the data is capable of displaying a fishing tournament-related display which includes information on fishing tournaments being prepared for opening and a registration menu; receiving applications through the registration menu and transmitting information on application receipts to the mobile devices through which applicants have registered; receiving information on captured fish, when a fishing tournament is started, from the mobile devices, so as to check the species and length thereof; analyzing the information on captured fish, generating ranking information if the analyzed information on captured fish corresponds to the predetermined reference, and then transmitting the ranking information to the mobile devices through which applicants have registered; and determining winners according to the ranking information when the fishing tournament is over and transmitting information including winner information to the mobile devices through which applicants have registered, thereby easily applying various rules what a host wants without any restrictions on the place, the time, the entry and etc., by using mobile devices.

In accordance with another aspect of the present invention, there is provided a method for providing a fishing tournament management service may further include steps of comparing fish species information included in the information on captured fish with fish species data pre-stored in the database and determining whether to correspond to the predetermined fish species or not; and receiving ranking information and displaying a real time-ranking display which shows the ranking in real time on the mobile devices through which applicants have registered.

In accordance with another aspect of the present invention, there is provided a processor-readable recording medium may record a program for running the above method in a processor.

The present invention is directed to providing a method for providing a fishing tournament management service, thereby easily applying various rules what a host wants to fishing tournaments and managing them without any restrictions on the place, the time, the entry and etc., by using mobile devices, such as a smart phone.

BRIEF DESCRIPTION OF THE DRAWINGS

The above and other aspect, features and advantages of certain exemplary embodiments of the present invention will be more apparent form the following description taken in conjunction with the accompanying drawings, in which.

DETAILED DESCRIPTION OF THE EMBODIMENTS

To facilitate an understanding of embodiments, principles and features of the present invention, they are described hereinafter with reference to implementation in illustrative embodiments.

Figure 1:
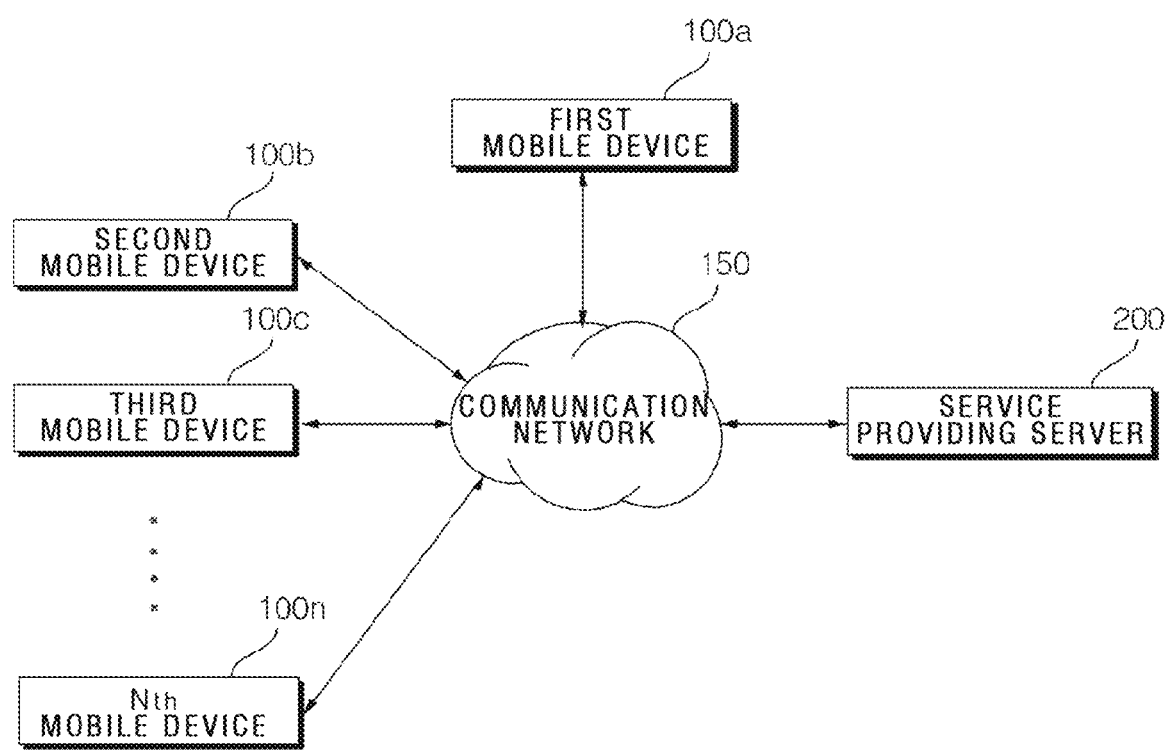
FIG. 1 is a drawing which describes an example of a system to be applied to a method for providing a fishing tournament managing service according to an exemplary embodiment of the present invention.

FIG. 1 is a drawing which describes an example of a system to be applied to a method for providing a fishing tournament managing service according to an exemplary embodiment of the present invention.

Referring to FIG. 1, each of first to $n_{th}$ mobile devices 100a to 100n may be connected to a service providing server 200 through a communication network 150 to communicate with each other.

The first to $n_{th}$ mobile devices 100a to 100n may be users' mobile devices for running an application (App) for fishing tournaments and generally include all electronic devices, such as a smart phone, a tablet computer, an e-book device and etc., capable of communicating with the service providing server 200 through the communication network 150.

The communication network 150 may mean a network which is, such as a mobile communication network, the internet, a conjunction network thereof or etc., capable of communicating each of the first to $n_{th}$ mobile devices 100a to 100n with the service providing sever 200 and also communicating the first to $n_{th}$ mobile devices 100a to 100n therewith.

According to the above described configuration, the service providing server 200 may provide the first to $n_{th}$ mobile devices 100a to 100n with menus and information which are related to fishing tournament management, such as registration therefor, broadcasting thereof, rewards and others.

Figure 2:
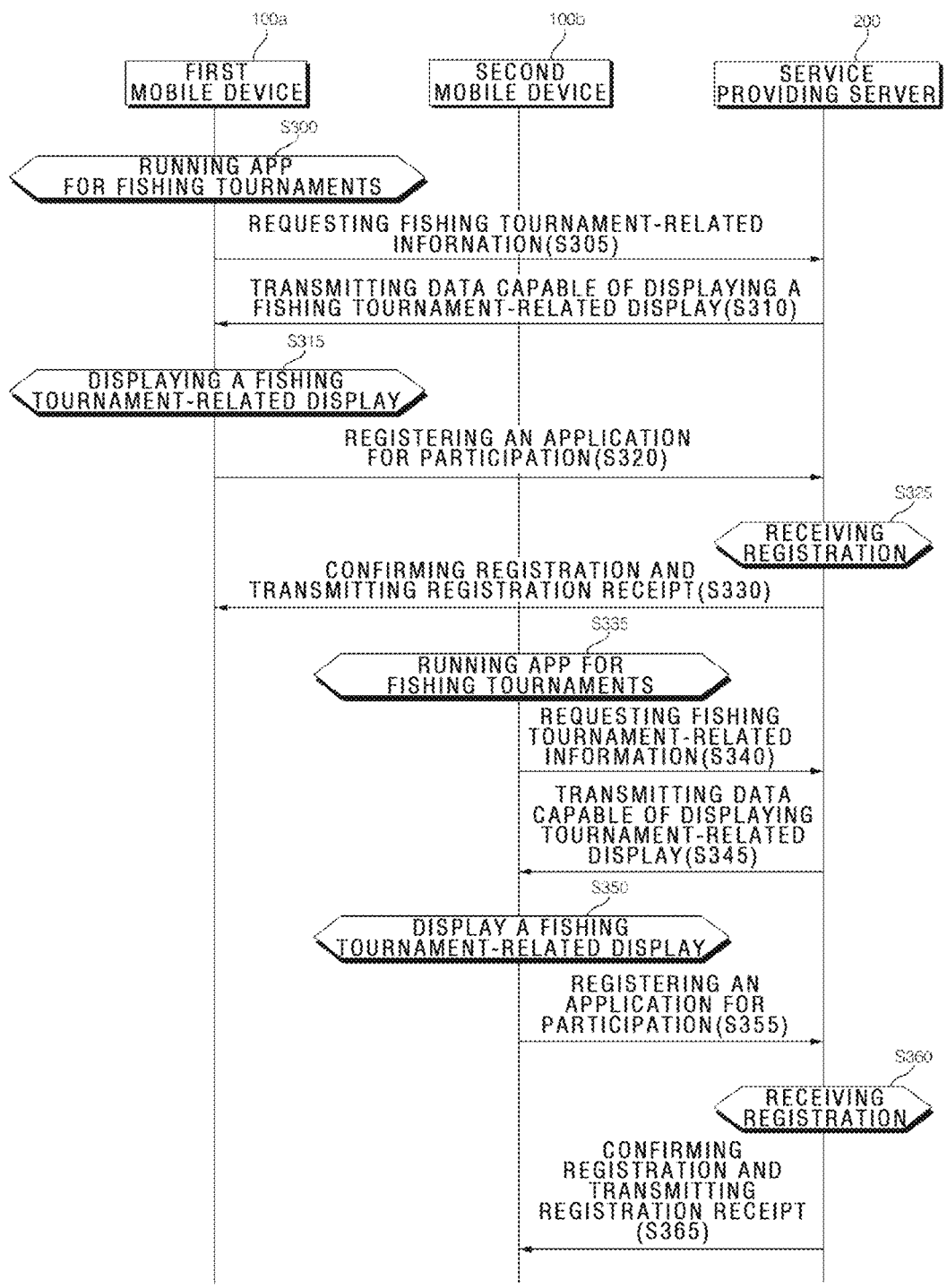
FIGS. 2 to 4 are flowcharts of signals provided to describe the method for providing a fishing tournament managing service according to the exemplary embodiment of the present invention.
Figure 3:
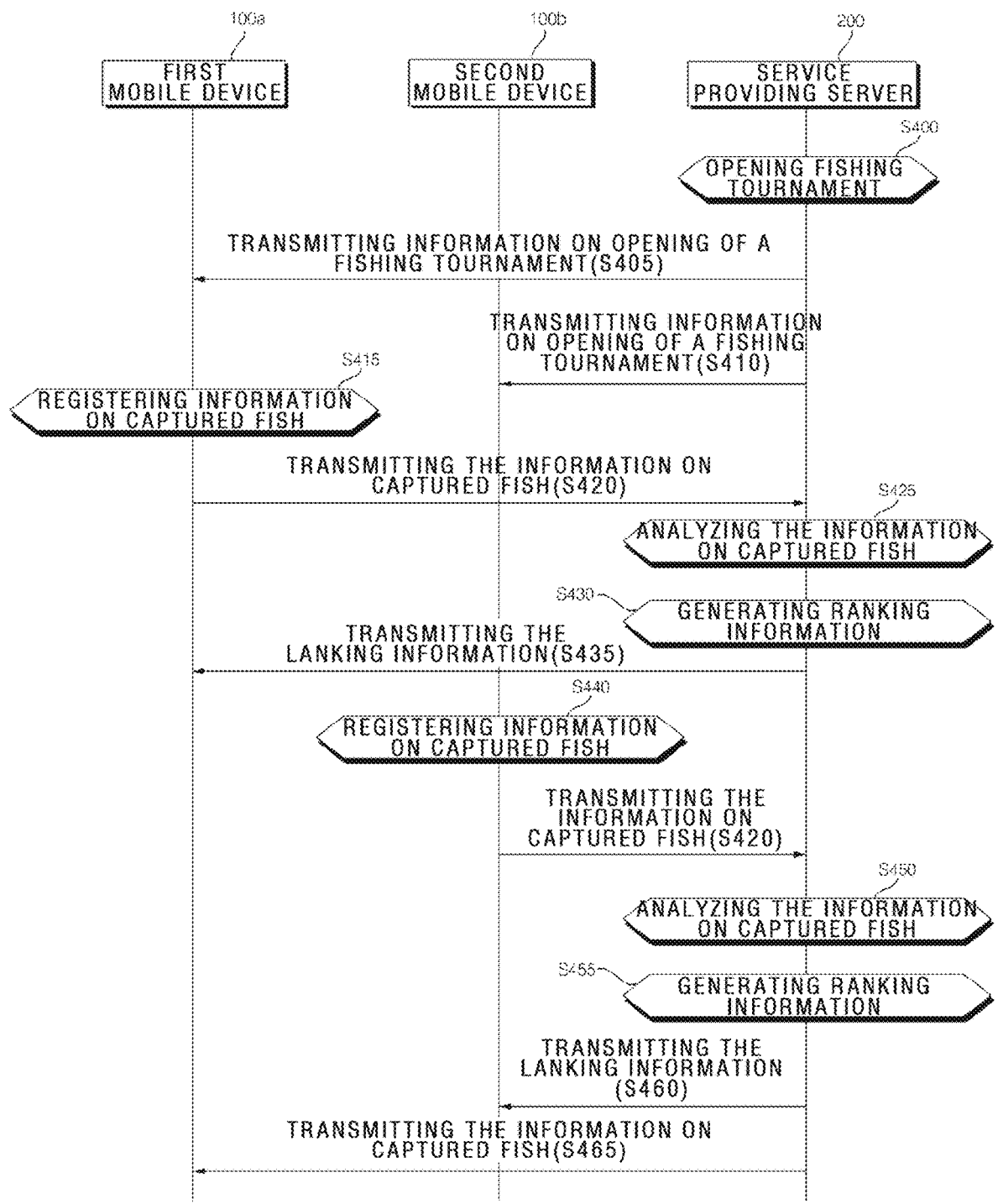
Figure 4:
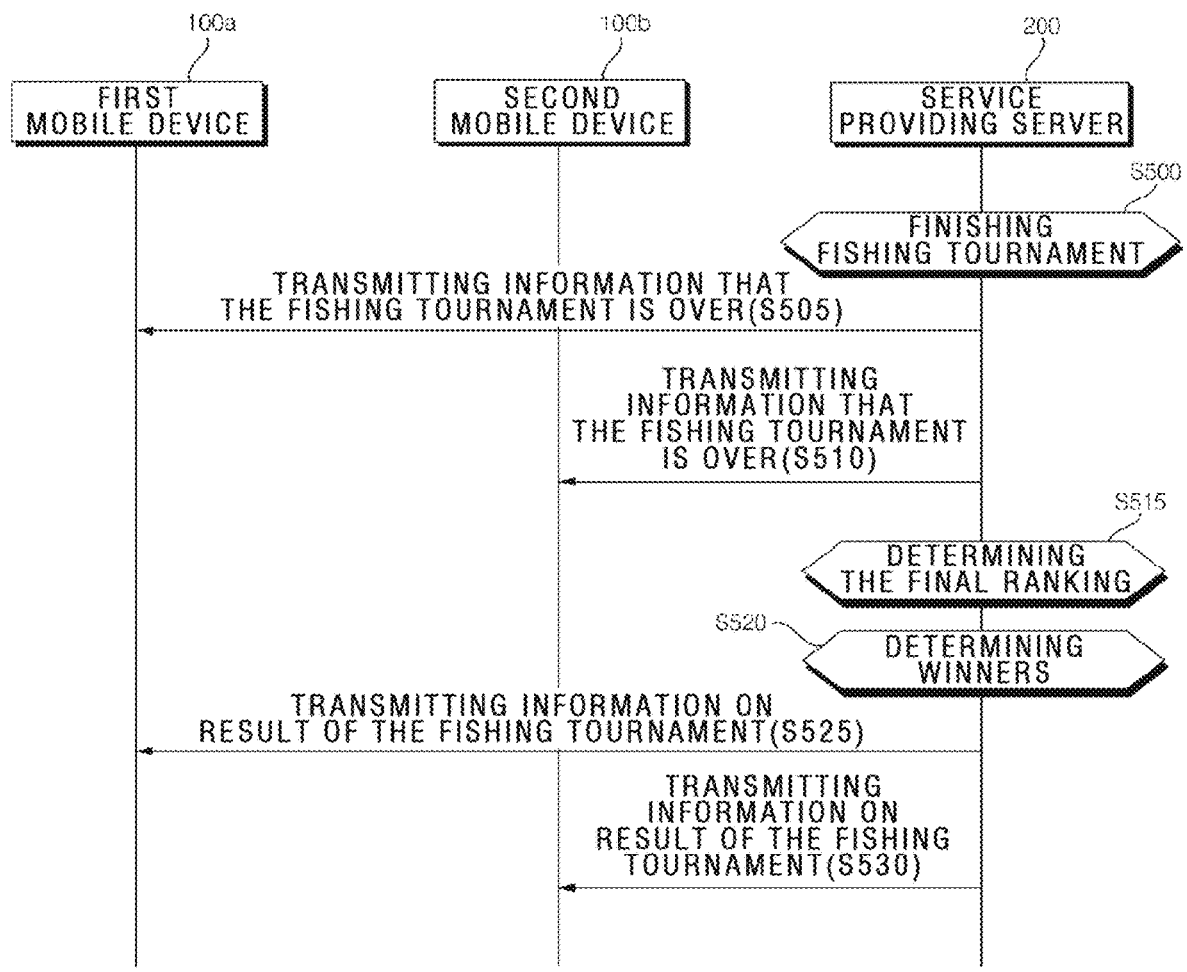

FIGS. 2 to 4 are flowcharts of signals provided to describe the method for providing a fishing tournament managing service according to the exemplary embodiment of the present invention. The case when there are two mobile devices will be described hereinafter for the convenience of the explanation, as an example.

Referring to FIG. 2, when running the downloaded App for fishing tournaments in the first mobile device 100a after finishing membership registration (S300), the first mobile device 100a may request fishing tournament-related information from the service providing server 200 (S305).

The service providing server 200 may transmit data capable of displaying a fishing tournament-related display which includes information on fishing tournaments being prepared for opening and a registration menu, to the first mobile device 100a (S310). Thus, the first mobile device 100a may display the fishing tournament-related display (S315) and a user of the first mobile device can check the information on the fishing tournaments being prepared for opening and register for what he/she wants to participated in (S320).

If there is an application for participation from the first mobile device 100a, the service providing server 200 may receive the registration (S325) and transmit information on the received registration and other information related thereto to the first mobile device 100a (S330).

Like the preceding, when running the downloaded App for fishing tournaments in the second mobile device 100b after finishing membership registration in advance (S335), the service providing server 200 may transmit data capable of displaying a fishing tournament-related display which includes information on the fishing tournaments being prepared for opening and a registration menu, to the second mobile device 100b (S345).

The second mobile device 100b may display the fishing tournament-related display (S350) and a user can check the information on the fishing tournaments being prepared for opening and register for what he/she wants to participated in (S355). Accordingly, registration information may be transmitted to the service providing server 200 so that the service providing server 200 receive the registration (S360). The service providing server 200 may transmit information on the received registration and other information related thereto to the second mobile device 100b (S365).

Procedures as the above may also proceed in other mobile devices. Thus, a plurality of participants can take part in fishing tournaments.

Referring to FIG. 3, when fishing tournaments are opened (S400), the service providing server 200 may transmit information on opening of a fishing tournament including information on opening of the fishing tournament for which applicants have registered and other information related thereto, to the first and second mobile devices through which applicants have registered (S405, S410).

When the fishing tournament is started, a user of the first mobile device 100a may register information on captured fish capable of checking the species and length of captured fish through the first mobile device 100a (S425) so as to transmit the information on captured fish from the first mobile device 100a to the service providing server 200 (S420).

The information on captured fish may be registered without any restriction on the number of times during the fishing tournament, and the information on captured fish, for example, may include photographed images of captured fish and information on positions where fish are captured. As transmitting photographs of the captured fish taken together with objects, such as a coin or a pack of cigarettes, of which lengths are known, the length thereof may be checked. Further, as transmitting photographs of the captured fish together with information on the distance, height and length of the photographed fish, through a sensor installed in the mobile devices, the length thereof may be checked. Apart from the method as described above, various methods can be used for checking the length of captured fish.

The service providing server 200 may analyze the information on captured fish to check the species of the captured fish (S425). If the analyzed information belongs to the notified species of the fishing tournament and corresponds to the predetermined reference, it may generate ranking information by applying the length of fish checked from the information on captured fish (S430).

It may be determined whether the species of the captured fish belongs to the predetermined species of the fishing tournament by comparison with information on species stored in the data base. Further, the ranking may be determined depending on the registered length of fish. If several pieces of information on captured fish having the same length are registered, the information registered first may become a high rank.

If the length of fish is not available to be measured or fish are captured from the prohibited fishing area, never is the registered information on captured fish applied to the determination of the ranking.

Wherein, the fishing prohibited area is where a total fishing ban has been imposed, and the fisheries restricted area is where fishing is permissible only during the permissible period of time by the permissible fishing method, thereby preventing environmental pollution resulting from fishing activities and preserving the natural ecological system. Thus, in the case of the fish captured in the fishing prohibited area, it is not reflected in registration and ranking determination. Meanwhile, in the case of the fish captured in the fishing restricted area, it may be reflected in registration and ranking determination only if captured during the permissible period of time by the permissible fishing method. Otherwise it is not reflected therein.

The service providing server 200 may transmit ranking information generated by applying the length of fish, to the first mobile device (S445). If predetermined rules are violated or the length of fish is not available to be measured, information on these circumstances may be transmitted to the first mobile device 100a instead of the ranking information.

A user of the first mobile device 100a may check the current ranking in real time through the ranking information received from the service providing server 200.

Procedures as the above may proceed in the second mobile device 100b the same as in the first mobile device (S440, S445, S450 and S455) so as to transmit the ranking information to the second mobile device 100b. If there is any changes in the ranking information according to the registration of information on captured fish in the second mobile device 100b, new ranking information may be transmitted to the first mobile device 100a (S465).

Referring to FIG. 4, if the fishing tournament is over as a prearranged period of time passes (S500), the service providing server 200 may transmit information that the fishing tournament is over to the first and second mobile devices 100a and 100b (S505 and S510).

When the fishing tournament is over, the service providing server 200 may determine the final ranking according to the registered information on captured fish (S515), followed by determining winners according to the determined ranking (S520). Further, information on result of the fishing tournament including the winners may be transmitted to the first and second mobile devices 100a and 100b (S525 and S530).

The method for providing a fishing tournament managing service is provided by the procedures as the above.

Meanwhile, the host or examiners of the fishing tournament may determine whether the captured fish are reflected in determining the ranking or not by analyzing the information on captured fish. Alternatively, it may be determined by participants' opinions. That is, when one participant registers information on captured fish, other participants may vote thereon to check the length of captured fish and to determine whether to violate other rules or not, thereby determining whether reflecting the registered information in determining the ranking or not, according to ratios of vote results. For example, the registered information may be automatically approved, if the disapproval ratio ranges from 10% to 30%. On the other hand, it may be determined whether the registered information will be finally approved or eliminated, by the examination of managers, if the disapproval ratio thereof ranges from 70% to 100%. As described above, the work load of managers may be reduced by introducing other participants' opinions.

FIGS. 5 to 12 are drawings which explain the method for providing a fishing tournament managing service according to the exemplary embodiment of the present invention.

Figure 5:
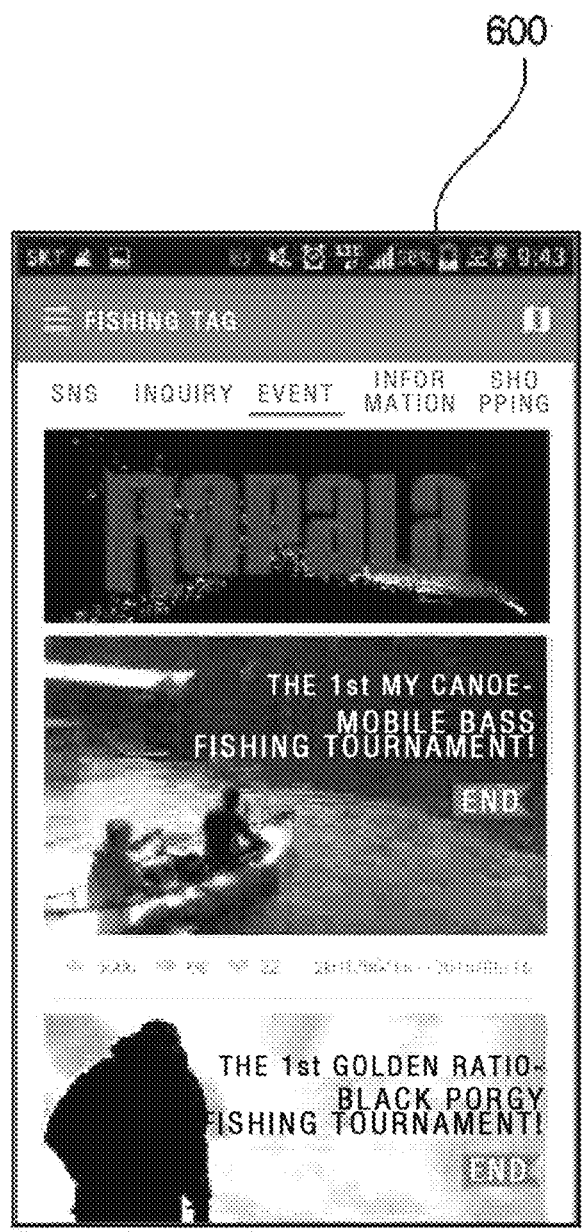
FIGS. 5 to 12 are drawings which describe the method for providing a fishing tournament managing service according to the exemplary embodiment of the present invention.

FIG. 5 illustrates one example of an initial display displayed when running the App for fishing tournaments on the mobile device.

As illustrated in FIG. 5, when running the App for fishing tournaments, the initial display 600 related thereto may be displayed. A user may choose a fishing tournament in which he/she wants to participate among fishing tournaments displayed on the initial display 600 and may enter into a related menu. Images or paragraphs for the promotion or the commercial may be displayed either on at least one part of the initial display or other displays or in popup boxes.

Figure 6:
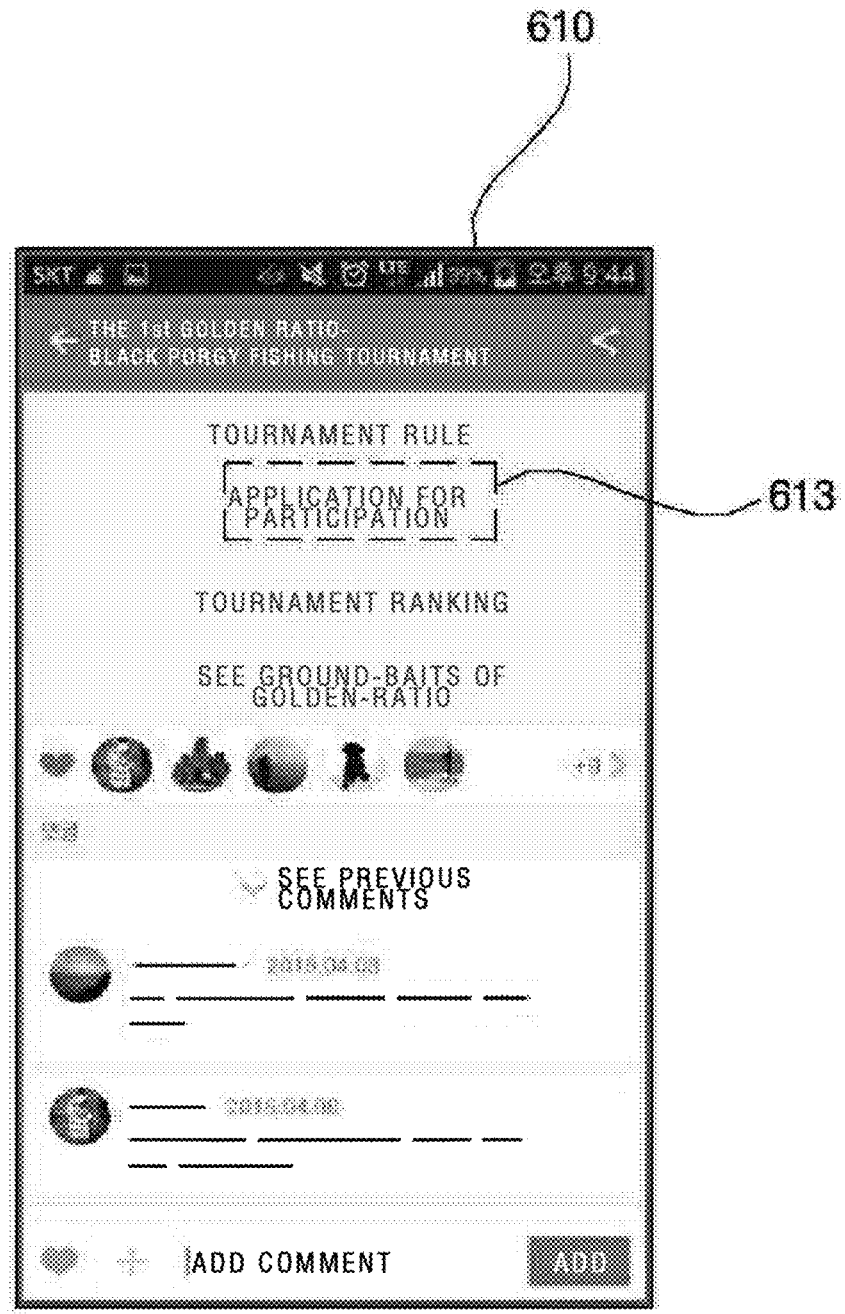

FIG. 6 illustrates one example of a display to be displayed when selecting a certain fishing tournament on the initial display.

As illustrated in FIG. 6, when selecting a certain fishing tournament, a display 610 related to the selected fishing tournament may be displayed. A user may select an item for 'application for participation' 613 on the display 610, thereby registering the related fishing tournament.

Figure 7:
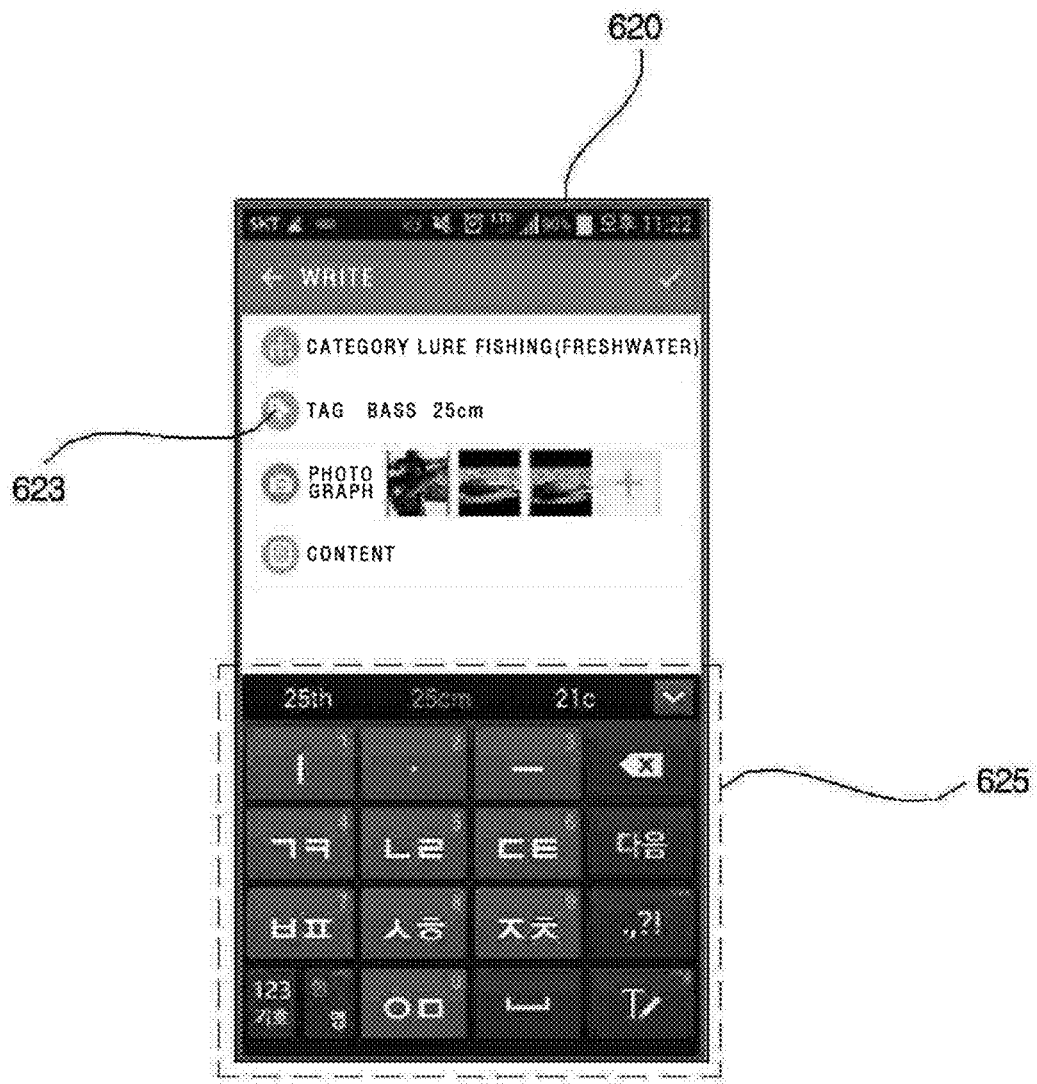

FIG. 7 illustrates one example of a display for registration of information on captured fish in the middle of the fishing tournament.

As illustrated in FIG. 7, information on captured fish may be registered through a registration display 620. It may be configured to register not images pre-stored in the mobile device but images photographed by the user directly while running the App for fishing tournaments, so as to prevent the user from attaching images opened from an album and to register directly photographed images of captured fish as information on captured fish. According to user's interface, it may be configured to register pre-stored photographs as the information on captured fish, by an appropriate method certificated in advance.

The user may take a photograph of captured fish followed by registration together with necessary content therefor input, by using a keyboard 625 positioned on the lower portion of the display.

It may be configured to automatically run GPS function on mobile devices when taking a photograph of the captured fish. Alternatively, it may be configured to take a photograph thereof followed by registration only when the GPS function is being run. Accordingly, the information on captured fish may include information on position where fish are captured. The information on position included therein may be used as additional information and may search the record and information of participants in the fishing tournament on the map.

Further, it may prevent illegal participation in the fishing tournament thereby.

FIGS. 8 to 12 illustrate one example of a real time-ranking display.

Figure 8:
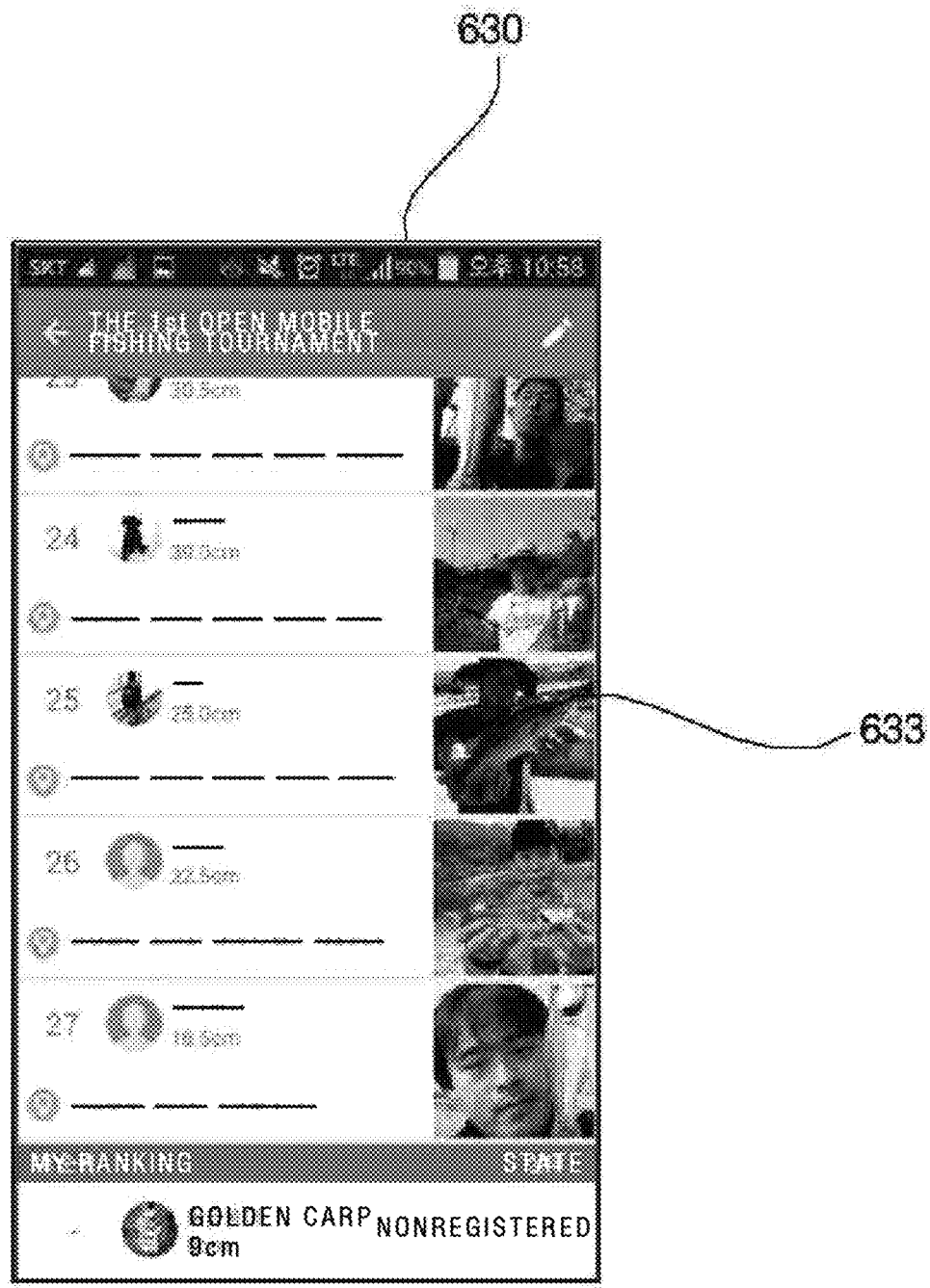

As illustrated in FIG. 8, the information on captured fish registered by participants may be analyzed in real time so as to display a real time-ranking display 630 showing the ranking with photographed images according to information on the length of captured fish.

Figure 9:
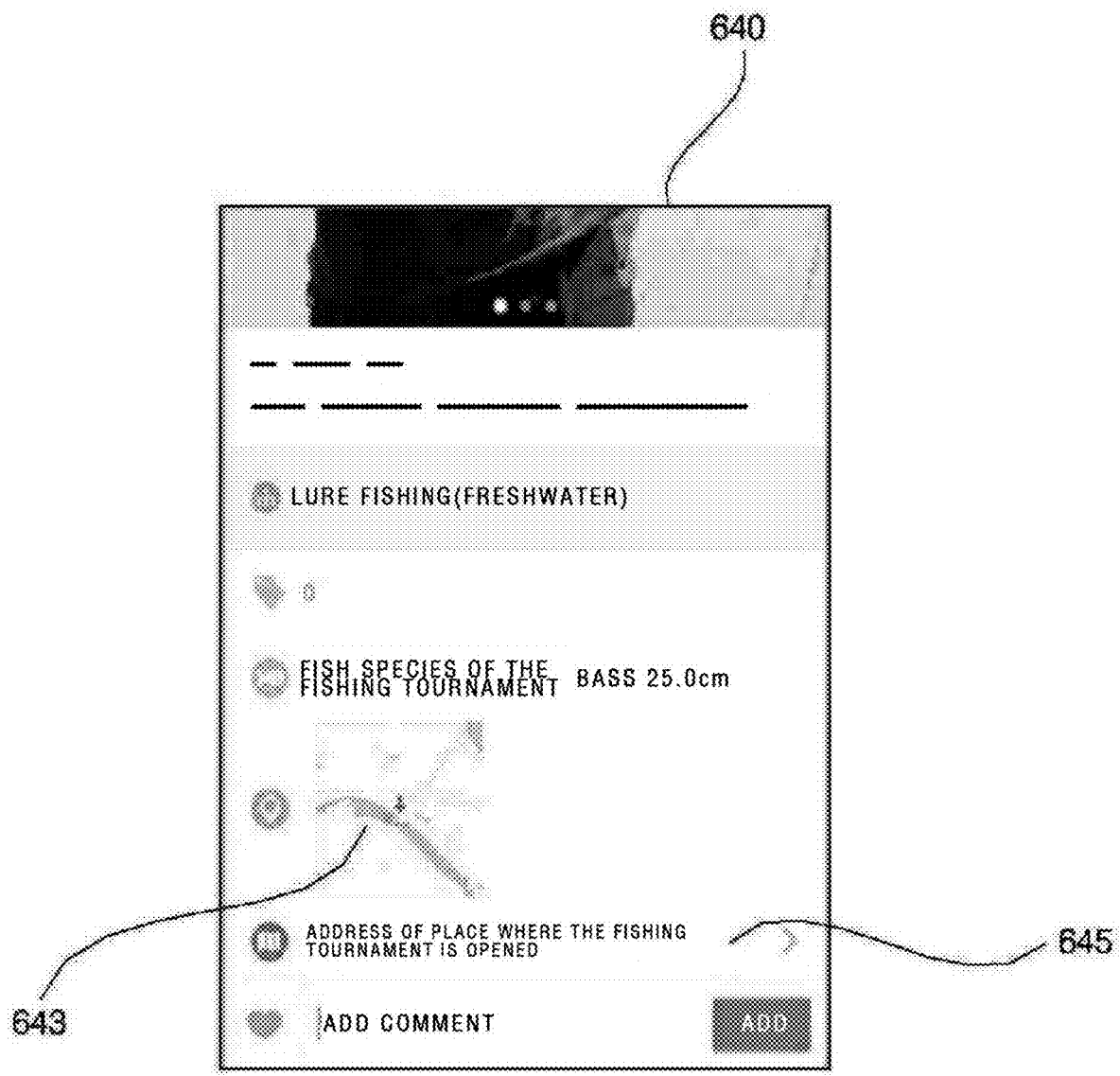

If selecting one of ranking items on the above real time-ranking display 630, a detailed display 640 for the related ranking may be displayed as illustrated in FIG. 9.

Figure 10:
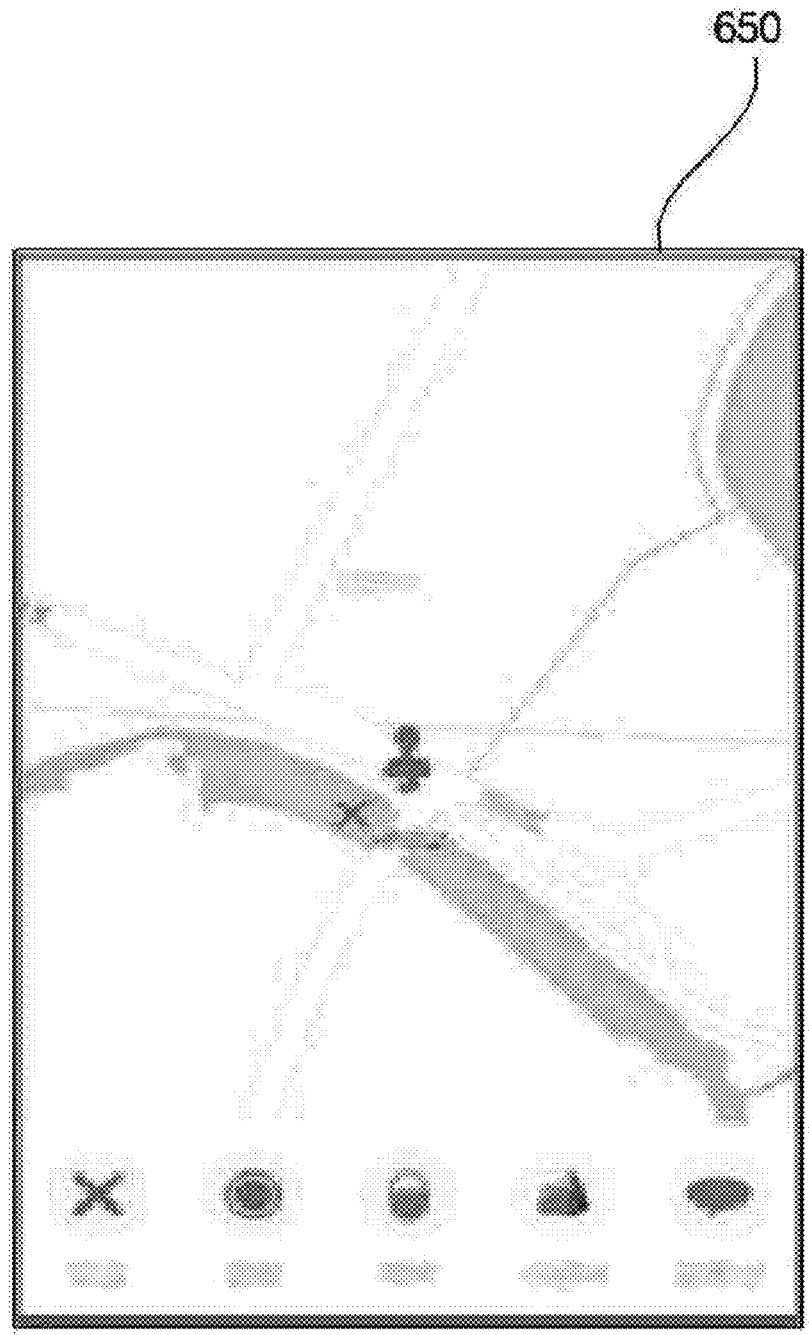
Figure 11:
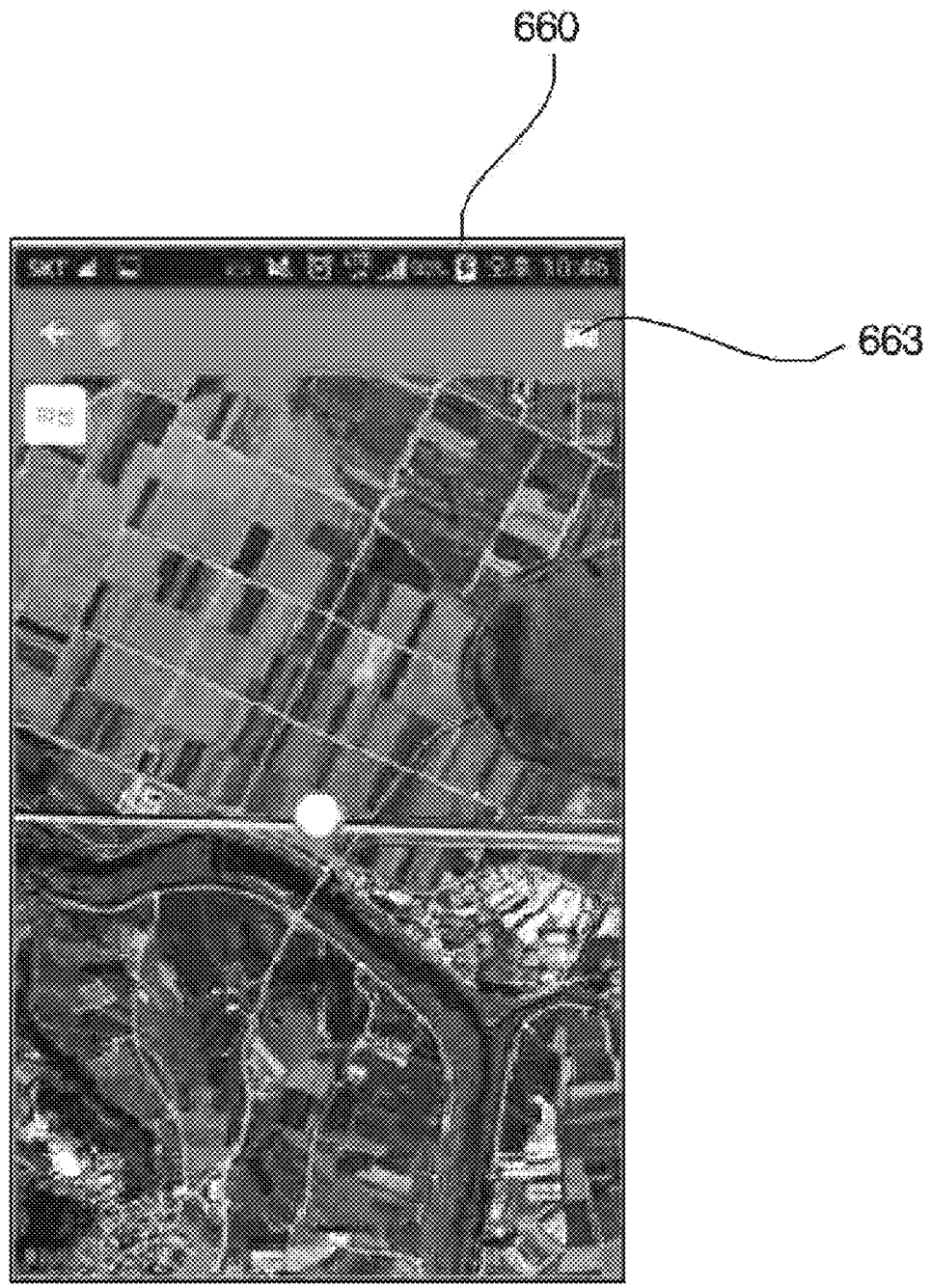
Figure 12:
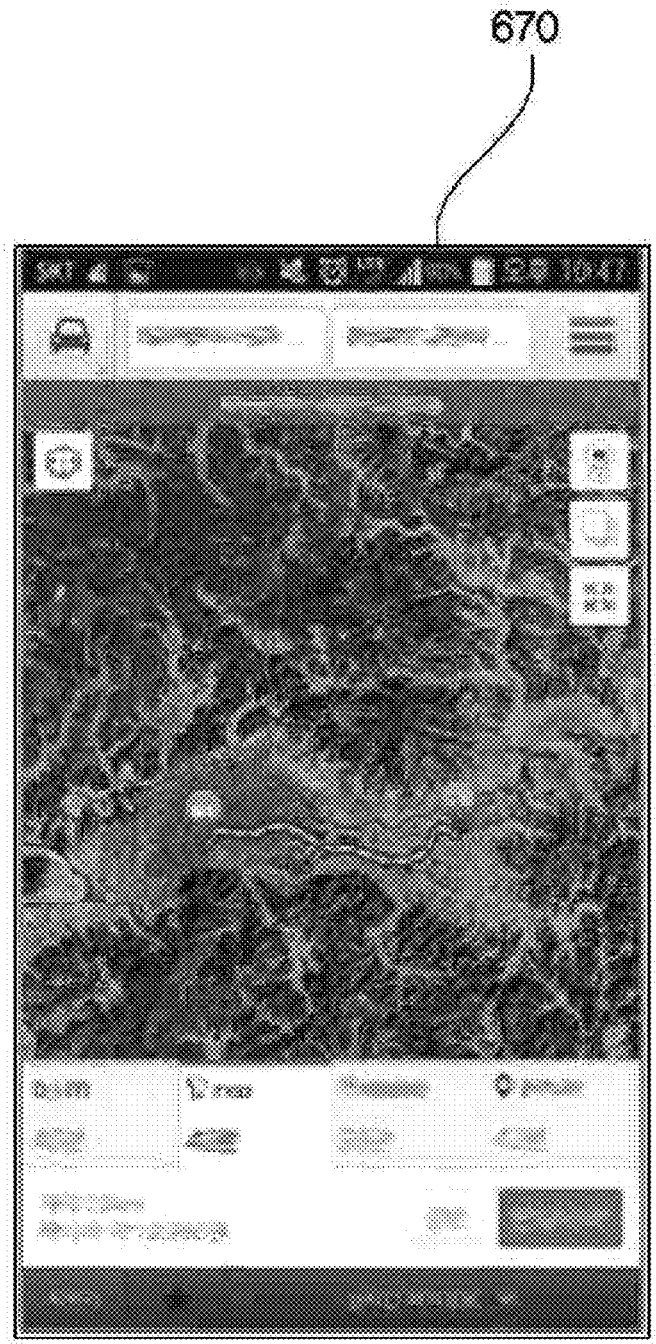

If selecting a map display 643 on the detailed display 640, an enlarged map display 650 may be displayed as illustrated in FIG. 10. Further, if selecting an address display 660 on the detailed display 640, a display 660 showing the position corresponding to the related address may be displayed as illustrated in FIG. 11. If selecting a search icon 663 on this display 660, a guide display 670 for searching the related address as illustrated in FIG. 12.

The information as the above may be an evidence of the position where fish are captured and it may be useful for other users as fishing information. Alternatively, a fishing tournament management service may be provided through various configurations of displays and menus.

The method for providing a fishing tournament management service according to the present invention is not limited to the configuration and method of the above described exemplary embodiment. The above exemplary embodiments may be configured by selectively combing the whole or part of each of the exemplary embodiments so as to be modified variously.

Meanwhile, the mobile device or server of the present invention may implement processor-readable codes in a processor-readable recording medium. The processor-readable recording medium may include all kinds of recording devices where processor-readable data is stored. The processor-readable recording media may include, for example, ROM, RAM, CD-ROM, magnetic tapes, floppy disks, optical data storage systems, and etc. They may also include transmission through the internet which is implemented into a carrier wave type. Further, the processor-readable media may be dispersed into computer systems which are connected with each other through the network so that the processor-readable code may be stored and executed.

In view of the foregoing, preferable exemplary embodiments of the present invention are described with reference to the accompanying drawings. However, the present invention is not limited to a certain exemplary embodiment described in detail herein and it is intended that the present invention cover modifications and variations of this invention provided they fall within the scope of the following claims. Rather, the exemplary embodiments are provided so that this disclosure will be through and complete, and will fully convey the idea of the present invention to those of ordinary skilled in the art.

INDUSTRIAL APPLICABILITY

The present invention may be used for fishing tournament management, by using mobile devices such as a smart phone.

What is claimed is:

1. A method for providing a fishing tournament management service, the method comprising steps of:
transmitting data to a plurality of mobile devices, wherein the data is capable of displaying a fishing tournament-related screen which shows information on fishing tournaments being prepared for opening and a registration menu;
receiving applications through the registration menu and transmitting information on receipt of the applications to the mobile devices through which applicants have registered;
receiving information on a captured fish, when a fishing tournament is started, from the mobile devices, so as to check a species and a length thereof;
analyzing the information on the captured fish, generating ranking information if the analyzed information on the captured fish corresponds to a predetermined reference, and then transmitting the ranking information to the mobile devices through which the applicants have registered, wherein it is determined whether the information on the captured fish corresponds to the predetermined reference, by at least one of fishing tournament managers' and participants' votes thereon;
receiving the ranking information and displaying a real time-ranking screen which shows a ranking in real time on the mobile devices through which the applicants have registered, wherein the real time-ranking screen displays items including a photograph of the captured fish in combination with a position where the fish is captured, by rankings; and
determining winners according to the ranking information, when the fishing tournament is over, and transmitting information including winner information to the mobile devices through which the applicants have registered.

2. The method of the claim 1, further comprising a step of:
downloading an application (App) for displaying the fishing tournament-related screen on the mobile devices and running the App.

3. The method of the claim 1, further comprising a step of:
comparing species information included in the information on the captured fish with species data pre-stored in a database and determining whether to correspond to a predetermined species.

4. The method of the claim 1, wherein the information on the captured fish includes photographed images of the captured fish and information on the position where fish is captured.

5. The method of the claim 1, wherein when one of the items is selected on the real time-ranking screen, a detailed screen displays detailed information on the selected item.

6. The method of the claim 1, further comprising a step of:
displaying either images or paragraphs for a promotion or a commercial on at least one part of the fishing tournament-related screen.

7. A processor-readable non-transitory recording medium which records a program for running the method in claim 1.

8. The method of the claim 1, further comprising a step of:
displaying a detailed screen including a map and an address showing the position where the fish was captured.

9. The method of the claim 1, further comprising a step of:
displaying the position corresponding to the address, when selecting the address on the detailed screen, and displaying a guide screen for guiding to the address, when selecting a search icon.

* * * * *